US010043285B2

(12) United States Patent
Kim

(10) Patent No.: US 10,043,285 B2
(45) Date of Patent: Aug. 7, 2018

(54) DEPTH INFORMATION EXTRACTING METHOD BASED ON MACHINE LEARNING AND APPARATUS THEREOF

(71) Applicant: ELECTRONICS AND TELECOMMUNICATIONS RESEARCH INSTITUTE, Daejeon (KR)

(72) Inventor: Hye-Jin Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/256,447

(22) Filed: Sep. 2, 2016

(65) Prior Publication Data

US 2017/0069094 A1    Mar. 9, 2017

(30) Foreign Application Priority Data

Sep. 4, 2015  (KR) .................. 10-2015-0125759

(51) Int. Cl.
*G06K 9/00* (2006.01)
*G06T 7/529* (2017.01)
*G06K 9/62* (2006.01)

(52) U.S. Cl.
CPC .......... *G06T 7/529* (2017.01); *G06K 9/00208* (2013.01); *G06K 9/627* (2013.01);
(Continued)

(58) Field of Classification Search
CPC ... G06T 7/0051; G06T 7/0075; G06T 7/0022; G06T 2207/10012; G06T 2207/10028;
(Continued)

(56) References Cited

U.S. PATENT DOCUMENTS

2012/0287249 A1   11/2012   Choo et al.
2013/0069939 A1*   3/2013   Sung ................. G06T 13/40
                                                                345/419

(Continued)

FOREIGN PATENT DOCUMENTS

JP          2012-008657 A     1/2012
KR   10-2012-0127323 A1    11/2012
(Continued)

OTHER PUBLICATIONS

Beom-Jin Lee et al., "RGB-D-T Face Recognition using Convolutional-Recursive Deep Learning", 2014, pp. 616-618, Korea Information Science Society.

*Primary Examiner* — Amir Alavi

(57) ABSTRACT

The disclosure relates to a method and an apparatus for extracting depth information from an image. A method for extracting depth information based on machine learning according to an exemplary embodiment of the present disclosure includes generating a depth information model corresponding to at least one learning image by performing machine learning using the at least one learning image and a plurality of depth information corresponding to the at least one learning image; and extracting depth information of a target image by applying the depth information model into the target image. Embodiments of the disclosure may allow extracting precise depth information from a target image.

17 Claims, 6 Drawing Sheets

(52) U.S. Cl.
CPC ............... *G06T 2207/10024* (2013.01); *G06T 2207/20081* (2013.01)

(58) Field of Classification Search
CPC ........... G06T 2207/20081; G06T 7/529; G06T 9/627; G06K 9/6256; G06K 9/66; G06K 9/627; H04N 13/0239; H04N 13/0082
See application file for complete search history.

(56) References Cited

U.S. PATENT DOCUMENTS

| | | | |
|---|---|---|---|
| 2013/0088575 A1 | 4/2013 | Park et al. | |
| 2014/0358475 A1* | 12/2014 | Boulkenafed | G01B 21/16 |
| | | | 702/152 |
| 2015/0002628 A1* | 1/2015 | Reif | G06T 7/0044 |
| | | | 348/46 |
| 2015/0092981 A1 | 4/2015 | Kim et al. | |
| 2015/0379426 A1* | 12/2015 | Steele | G06N 99/005 |
| | | | 706/12 |
| 2015/0379429 A1* | 12/2015 | Lee | G06N 99/005 |
| | | | 706/11 |
| 2017/0069094 A1* | 3/2017 | Kim | G06K 9/00208 |
| 2017/0200313 A1* | 7/2017 | Lee | G06T 19/006 |
| 2017/0236332 A1* | 8/2017 | Kipman | G02B 27/0172 |
| | | | 345/633 |

FOREIGN PATENT DOCUMENTS

| | | |
|---|---|---|
| KR | 10-2013-0037152 A1 | 4/2013 |
| KR | 10-2015-0039252 A | 4/2015 |

\* cited by examiner

DEPTH INFORMATION EXTRACTING METHOD BASED ON MACHINE LEARNING AND APPARATUS THEREOF

CROSS REFERENCE TO RELATED APPLICATION

This application claims the benefit under 35 U.S.C. § 119(a) of Korean Patent Application No. 10-2015-0125759 filed on Sep. 4, 2015 in the Korean Intellectual Property Office, the entire disclosure of which is incorporated herein by reference for all purposes.

BACKGROUND

1. Technical Field

The following description relates to a method and an apparatus for extracting depth information from an image.

2. Description of Related Art

Various methods and various 3D sensors for extracting depth information have been used for extracting depth information. For example, various methods such as a stereo method, time of flight (TOF) method, a structured light method and a multi-camera array method, etc. have been used for extracting depth information. Various 3D sensors such as a light detection and ranging (LIDAR) sensor or a laser sensor have been also used for extracting depth information.

Conventional methods for extracting depth information have their own restrictions. For example, the stereo method cannot obtain precise depth information in real time, the TOF method can be only used indoor, and the method using a laser sensor is highly expensive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Exemplary embodiments of the disclosure are to provide a method for extracting depth information which can resolve all restrictions caused by the conventional methods.

According to one general aspect, a method for extracting depth information based on machine learning includes generating a depth information model corresponding to at least one learning image by performing machine learning using the at least one learning image and a plurality of depth information corresponding to the at least one learning image; and extracting depth information of a target image by applying the depth information model into the target image.

In an embodiment, the generating of a depth information model may include generating an $N^{th}$ depth information submodel by performing machine learning using the at least one learning image and $N^{th}$ depth information corresponding to the at least one learning image; and generating the depth information model by performing the machine learning using the generated N depth information submodels.

In an embodiment, the extracting of depth information may include loading a depth information model corresponding to the target image and applying the loaded depth information model into the target image to extract depth information for the target image.

In an embodiment, the plurality of depth information may be obtained through depth information extraction methods which are different from one another.

In an embodiment, the method may further include generating a learning image having improved depth information by performing machine learning using the depth information model and the at least one learning image.

In an embodiment, the depth information model may represent a relationship between the learning image and the plurality of depth information.

According to another general aspect, an apparatus for extracting depth information based on machine learning includes a depth information model learning unit configured to generate a depth information model corresponding to at least one learning image by performing machine learning using the at least one learning image and a plurality of depth information corresponding to the at least one learning image; and a depth information sensing unit configured to extract depth information of a target image by applying the depth information model into the target image.

In an embodiment, the depth information model learning unit may generate an $N^{th}$ depth information submodel by performing machine learning using the at least one learning image and $N^{th}$ depth information corresponding to the at least one learning image, and generate the depth information model by performing the machine learning using the generated N depth information submodels.

In an embodiment, the depth information sensing unit may load a depth information model corresponding to the target image and apply the loaded depth information model into the target image to extract depth information for the target image.

In an embodiment, the apparatus may further include a depth information obtaining unit configured to obtain the plurality of depth information.

In an embodiment, the plurality of depth information may be obtained through depth information extraction methods which are different from one another.

In an embodiment, the depth information model learning unit may be configured to generate a learning image having improved depth information by performing machine learning using the depth information model and the at least one learning image.

In an embodiment, the depth information model may represent a relationship between the learning image and the plurality of depth information.

According to further another general aspect, an apparatus for extracting depth information based on machine learning includes a depth information model learning unit configured to generate a depth information model corresponding to a plurality of learning images by performing machine learning using the plurality of learning images and at least one depth information corresponding to the plurality of learning images; and a depth information sensing unit configured to extract depth information of a target image by applying the depth information model into the target image.

In an embodiment, the depth information model learning unit may generate a $N^{th}$ depth information submodel by performing machine learning using the at least one depth information and $N^{th}$ learning image corresponding to the at least one depth information, and generate the depth information model by performing machine learning using the generated N depth information submodels.

In an embodiment, the depth information sensing unit may load a depth information model corresponding to the target image and apply the loaded depth information model into the target image to extract depth information for the target image.

In an embodiment, the apparatus may further include a depth information obtaining unit configured to obtain the plurality of depth information.

In an embodiment, the plurality of depth information may be obtained through methods for extracting depth information which are different from one another.

In an embodiment, the depth information model learning unit may be configured to generate a learning image having improved depth information by performing machine learning using the depth information model and the plurality of learning images.

In an embodiment, the depth information model may represent relationship between the learning image and the plurality of depth information.

Exemplary embodiments of the disclosure may allow extracting precise depth information from a target image.

BRIEF DESCRIPTION OF DRAWINGS

Hereinafter, the following description will be described with reference to embodiments illustrated in the accompanying drawings. To help understanding of the following description, throughout the accompanying drawings, identical reference numerals are assigned to identical elements. The elements illustrated throughout the accompanying drawings are mere examples of embodiments illustrated for the purpose of describing the following description and are not to be used to restrict the scope of the following description.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Since there can be a variety of permutations and embodiments of the following description, certain embodiments will be illustrated and described with reference to the accompanying drawings. This, however, is by no means to restrict the following description to certain embodiments, and shall be construed as including all permutations, equivalents and substitutes covered by the ideas and scope of the following description. Throughout the description of the present disclosure, when describing a certain technology is determined to evade the point of the present disclosure, the pertinent detailed description will be omitted. Unless clearly used otherwise, expressions in the singular number include a plural meaning.

As described above, conventional methods for extracting depth information have their own drawbacks. For example, depth information obtained through an active depth sensor method has high accuracy but low resolution, while that obtained through a passive depth sensor method has high resolution but low accuracy.

Depth information obtained through a sensor which is located in a remote distance from an object represents depth information for the entire object but has a low resolution, while depth information obtained through a sensor which is located in a near distance from an object represents depth information for a part of the object but has a high resolution.

Quality of depth information may vary with methods used for extracting depth information or environments where depth information is extracted.

Therefore, when a model of an object is generated by reflecting depth information obtained through an active depth sensor method and that obtained through a passive depth sensor method, depth information with high resolution and high accuracy may be obtained by using the model from various images related to the object.

In addition, when a model of an object is generated by reflecting depth information obtained through a sensor located in a near distance from the object and that obtained through a sensor located in a remote distance from the object, depth information represented with the entire object and specific parts thereof in detail may be obtained by using the model from various images related to the object.

Accordingly, the following disclosure is to provide a method for generating a depth information model of an object by performing machine learning using depth information that can best express the object. The following disclosure is further to provide a method for extracting improved depth information from a target image using the generated depth information model.

Figure 1:
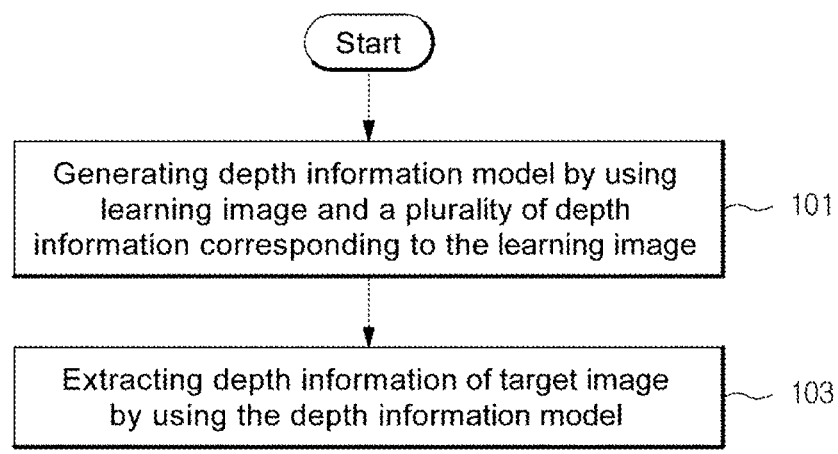
FIG. 1 is a diagram describing the concept of a method for extracting depth information based on machine learning according to an exemplary embodiment of the present disclosure.

FIG. 1 is a diagram describing the concept of a method for extracting depth information based on machine learning according to an exemplary embodiment of the present disclosure.

In step 101, the apparatus for extracting depth information based on machine learning may generate a depth information model corresponding to an image used for machine learning (hereinafter, referred to as learning image) by performing machine learning using the learning image and a plurality of depth information corresponding to the learning image. The learning image may be a RGB image and the plurality of depth information may be obtained using methods for extracting depth information which are different with each other or in environments which are different with each other.

As described above, the exemplary embodiment of the present disclosure performs machine learning using depth information that can best express an object to generate a depth information model for the object. For example, when an object is a human being, machine learning is performed using depth information of the entire human body obtained through a sensor located in a remote distance from the human being and depth information of a part of the human body, for example a hand, obtained through a sensor located in a near distance from the human being to generate a depth information model of the human being. In this case, the depth information model of the human being may represent general depth information of the entire human body and detail depth information of a part of the human body, for example a hand.

In step 103, the apparatus for extracting depth information based on machine learning may extract depth information of the target image by applying the depth information model into the target image which may be a RGB image. The apparatus for extracting depth information based on machine learning may extract improved depth information from the target image by using the depth information model generated by reflecting depth information obtained through various methods or various environments.

For example, when the target image is the human body image, the apparatus for extracting depth information based on machine learning may extract improved depth information by applying the depth information model of the human body into the target image.

As described above, the depth information model of a human body may be a model which is generated by reflecting depth information obtained through a sensor located in a near distance from the human being and depth information obtained through a sensor located in a remote distance from the human being. Thus, when this depth information model is applied to the target image, both general depth information of the entire human body and detail depth information of a part of the human body, for example a hand, may be extracted.

Figure 2:
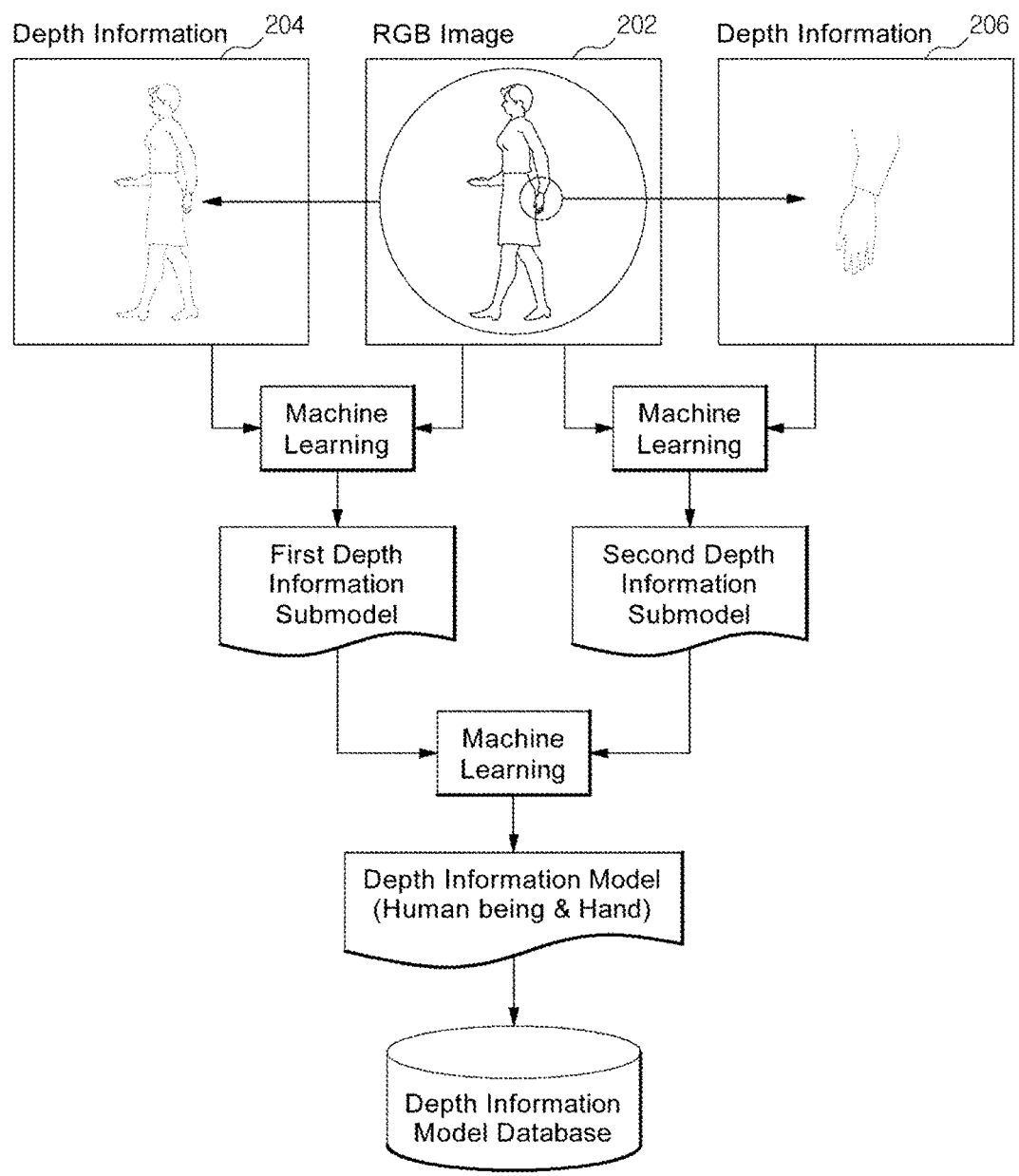
FIG. 2 is a diagram describing a method for generating a depth information model according to an exemplary embodiment of the present disclosure.

FIG. 2 is a diagram describing a method for generating a depth information model according to an exemplary embodiment of the present disclosure.

In an embodiment to be explained with reference to FIG. 2, it is assumed that a depth information model is generated by using a learning image 202 of the entire human body, depth information 204 obtained through a sensor located in a remote distance from a human being and depth information 206 obtained through a sensor located in a near distance from the human being. It is also assumed that the depth information 204, obtained through the sensor located in a remote distance from the human being, may be depth information of the entire human body and the depth information 206, obtained through the sensor located in a near distance from the human being, may be detail depth information of a specific part of the human body (hereinafter, it is assumed that the specific part of the human body is a hand).

The apparatus for extracting depth information based on machine learning may perform learning using the learning image 202, the depth information 204, and the depth information 206.

First, the apparatus for extracting depth information based on machine learning may first perform learning using the learning image 202 and the depth information 204. The machine learning may be performed by using various algorithms such as a deep learning method. When the machine learning is performed by using the learning image 202 and the depth information 204, a depth information model representing depth information of the entire human body may be generated. It is called as a first depth information submodel, for the convenience of description, which represents relationship between the learning image 202 and the depth information 204. This may mean that the first depth information submodel includes parameters representing relationship between the learning image 202 and the depth information 204. These parameters may be determined and adjusted during modeling process through various learning methods such as the deep learning method.

The apparatus for extracting depth information based on machine learning may perform learning using the learning image 202 and the depth information 206 to generate a depth information model representing depth information of a hand of the human being. It is called as a second depth information submodel which may represent relationship between the learning image 202 and the depth information 206. The second depth information submodel may represent depth information of the hand in more detail, compared to the first depth information submodel.

The apparatus for extracting depth information based on machine learning may generate a depth information model by learning the first depth information submodel and the second depth information submodel. The depth information model may be also generated through various learning methods such as the deep learning method. The depth information model may represent relationship between the learning image 202 and the depth information 204/206. The depth information model may include all benefits which the first depth information submodel and the second depth information submodel have. For example, the depth information model may represent depth information of the entire human body and detail depth information of a hand of the human body.

During machine learning for generating the depth information model, one or more depth information and two or more learning images for the same object can be used. In this case, a depth information model representing more detail and much depth information may be generated. Accordingly, depth information with higher quality can be acquired in a test step (a step for extracting depth information in FIG. 3).

The depth information model generated thereby may be stored in a database. According to an embodiment, machine learning using the depth information 204 and the depth information 206 may be first performed and the result may be applied to a learning image to generate a depth information model.

After the depth information model is generated, further learning may be performed by using the depth information model and the learning image to update the depth information model.

Figure 3:
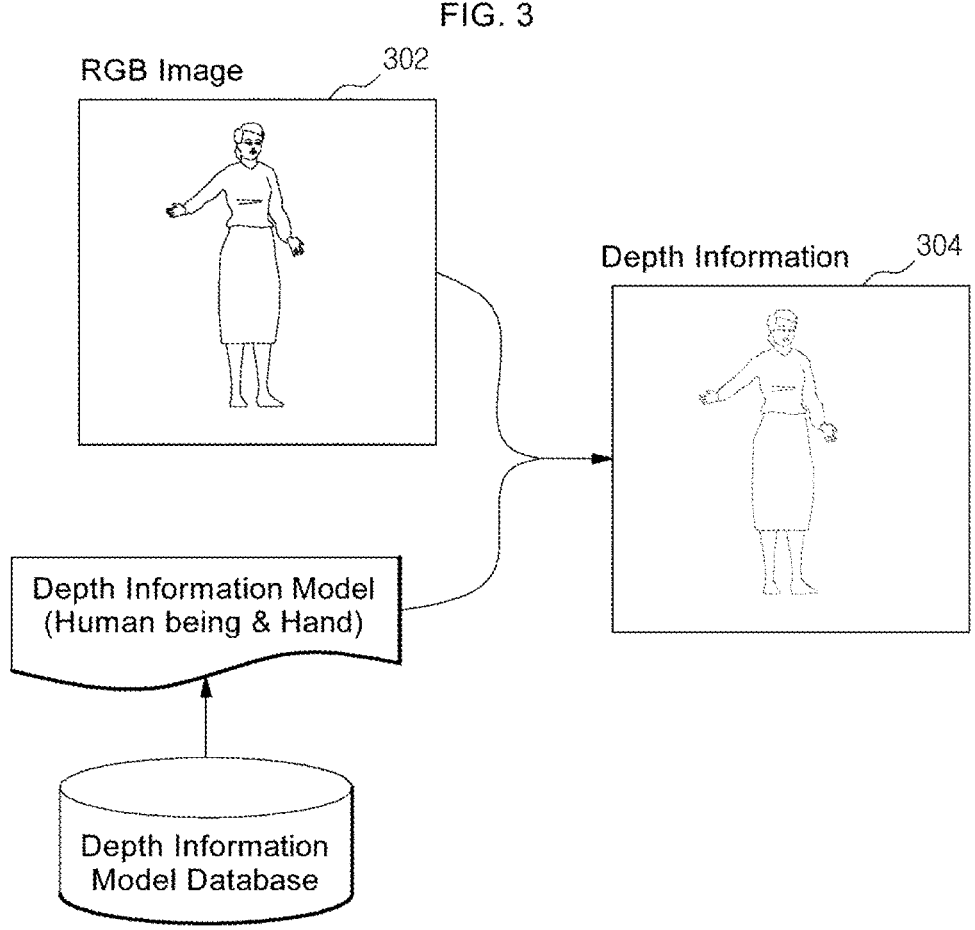
FIG. 3 is a diagram describing a method for extracting depth information according to an exemplary embodiment of the present disclosure.

FIG. 3 is a diagram describing a method for extracting depth information according to an exemplary embodiment of the present disclosure.

In an embodiment to be explained with reference to FIG. 3, it is assumed that depth information is extracted from a target image 302 of a human body.

The apparatus for extracting depth information based on machine learning may identify a target image 302 and load a depth information model corresponding to the target image 302. The target image 302 may be identified through various methods such as an image recognition method.

When the target image 302 is a human body image, the apparatus for extracting depth information based on machine learning may load a depth information model corresponding to the human body. Here, it is assumed that the depth information model corresponding to the human body is a depth information model described with reference to FIG. 2.

The apparatus for extracting depth information based on machine learning may extract depth information 304 for the target image 302 by applying the loaded depth information model into the target image 302. As described above, the depth information model may represent general depth information of the entire human body and detail depth information of the hand of the human body. Accordingly, when the depth information model is applied into the target image 302, general depth information of the entire human body and detail depth information of the hand of the human body may be extracted from the target image 302.

Figure 4:
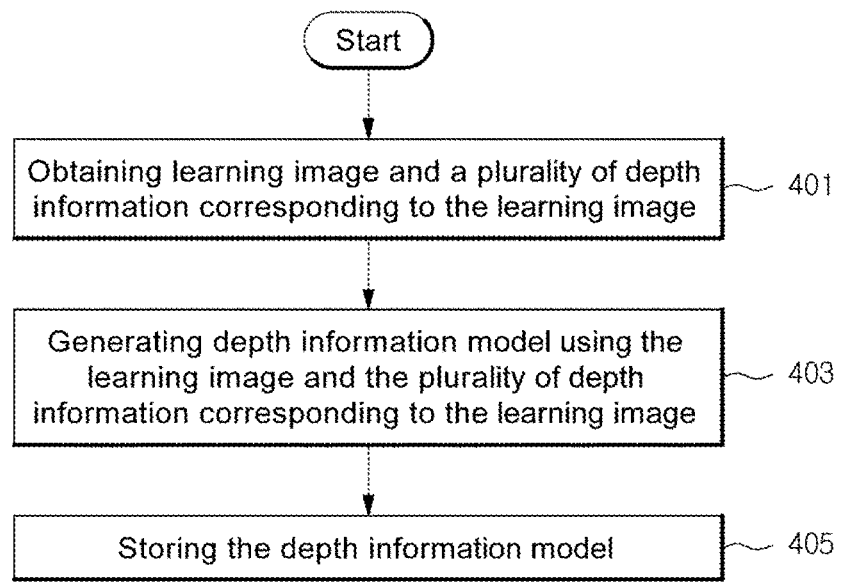
FIG. 4 is a flow chart describing a method for generating a depth information model according to an exemplary embodiment of the present disclosure.

FIG. 4 is a flow chart describing a method for generating a depth information model according to an exemplary embodiment of the present disclosure. At least one step described in FIG. 4 can be omitted.

In step 401, the apparatus for extracting depth information based on machine learning may obtain a learning image and a plurality of depth information corresponding to the learning image.

The plurality of depth information corresponding to the learning image may be obtained through methods for extracting depth information or from environments which are different with each other. For example, one among the plurality of depth information may be depth information obtained by using a structured light method and another may be depth information obtained by using a laser method.

In step 403, the apparatus for extracting depth information based on machine learning may perform learning using a learning image and a plurality of depth information corresponding to the learning image to generate a depth information model corresponding to the learning image.

In step 405, the apparatus for extracting depth information based on machine learning may store the generated depth information model in a depth information model database.

The method for generating a depth information model using one learning image and a plurality of depth information has been explained above. According to an embodiment, a depth information model may be generated by using a plurality of learning images and one depth information or a plurality of learning images and a plurality of depth information.

Moreover, the apparatus for extracting depth information based on machine learning may generate a learning image having improved depth information by performing machine learning using the generated depth information model and the at least one learning image. The generated learning image may be used for updating the depth information model.

Figure 5:
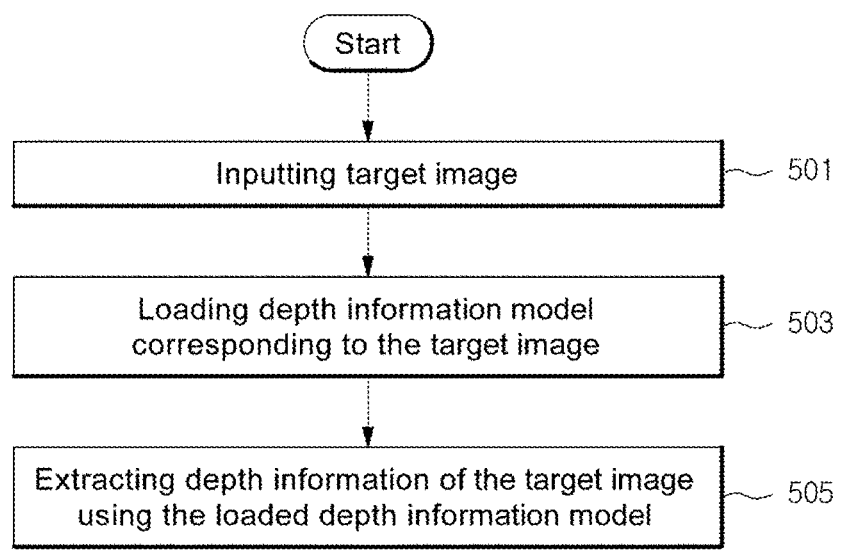
FIG. 5 is a flow chart describing a method for extracting depth information according to an exemplary embodiment of the present disclosure.

FIG. 5 is a flow chart describing a method for extracting depth information according to an exemplary embodiment of the present disclosure. At least one step described in FIG. 5 can be omitted.

In step 501, the apparatus for extracting depth information based on machine learning may receive a target image. Here, the target image may be a RGB image obtained through a camera.

In step 503, the apparatus for extracting depth information based on machine learning may identify the target image and load a depth information model corresponding to the target image. For example, when it is identified that the target image is a human body image, the apparatus for extracting depth information based on machine learning may load a depth information model corresponding to the human body from a depth information model database.

In step 505, the apparatus for extracting depth information based on machine learning may extract depth information of the target image by using the loaded depth information model. In other words, the apparatus for extracting depth information based on machine learning may extract depth information of the target image by applying the loaded depth information model into the target image.

Figure 6:
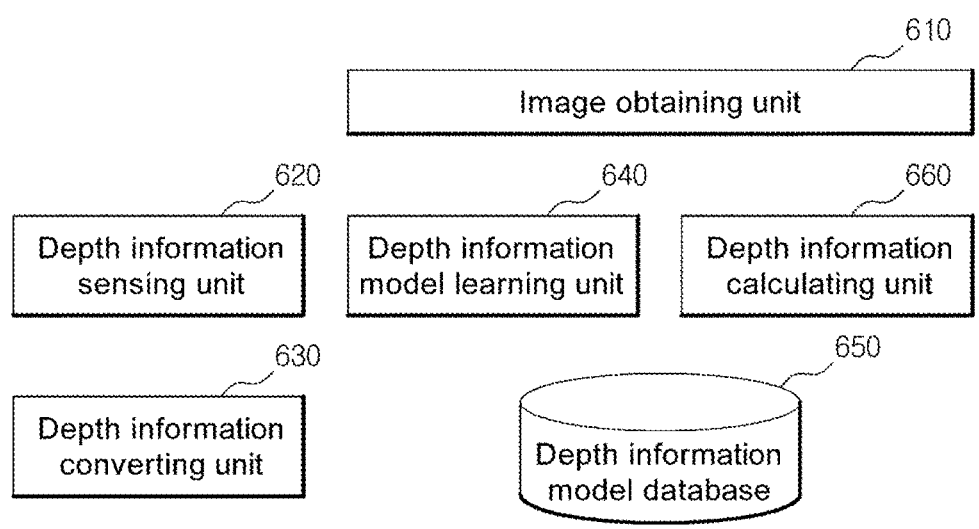
FIG. 6 is a diagram describing an apparatus for extracting depth information according to an exemplary embodiment of the present disclosure.

FIG. 6 is a diagram describing an apparatus for extracting depth information according to an exemplary embodiment of the present disclosure.

The apparatus for extracting depth information based on machine learning may include an image obtaining unit 610, a depth information sensing unit 620, a depth information converting unit 630, a depth information model learning unit 640, a depth information model database 650, and a depth information calculating unit 660. At least one element described in FIG. 6 can be omitted.

The image obtaining unit 610 may obtain at least one of a learning image and a target image. The learning image and the target image may be a RGB image. The image obtaining unit 610 may include a camera configured to take a photo of at least one of the learning image and the target image. The image obtaining unit 610 may include a communication interface configured to communicate with an external device. Here, the image obtaining unit 610 may receive at least one of the learning image and the target image from the external device.

The depth information sensing unit 620 may obtain at least one depth information corresponding to at least one learning image. The depth information sensing unit 620 may obtain depth information by using various methods for extracting depth information. For example, the depth information sensing unit 620 may obtain depth information from the learning image by using an active depth sensor method or a passive depth sensor method. For example, the depth information sensing unit 620 may obtain depth information from the learning image by using at least one method chosen from a stereo method, a multi-camera array method, a structured light method, a TOF method, a LIDAR method, a laser method, and an ultrasonic method. The depth information sensing unit 620 may obtain depth information from various environments. For example, the depth information sensing unit 620 may obtain depth information through a sensor located in a near distance from the object and that obtained through a sensor located in a remote distance from the object.

The depth information converting unit 630 may convert the plurality of depth information obtained from the learning image to have identical specification. The depth information converting unit 630 may store conversion rules which are used to convert the depth information to have a predetermined specification.

The depth information model learning unit 640 may perform learning using at least one learning image and a plurality of depth information corresponding to the at least one learning image to generate one depth information model corresponding to the at least one learning image. For example, the depth information model learning unit 640 may perform learning using at least one learning image and $N^{th}$ depth information corresponding to the at least one learning image to generate the $N^{th}$ depth information submodel. The depth information model learning unit 640 may perform learning using the generated N depth information submodels to generate one depth information model.

The depth information model learning unit 640 may perform learning using a plurality of learning images and at least one depth information corresponding to the plurality of learning images to generate one depth information model corresponding to the plurality of learning images. For example, the depth information model learning unit 640 may perform learning using at least one depth information and a $N^{th}$ learning image corresponding to the at least one depth information to generate a $N^{th}$ depth information submodel, and may perform learning using the generated N depth information submodels to generate one depth information model.

Depending on the embodiment, the depth information model learning unit 640 may generate a learning image having improved depth information by performing machine learning using the generated depth information model and the at least one learning image. The generated learning image may be used for updating the depth information model.

Various methods may be used for the learning. For example, a deep learning method may be used for the learning. Multi-level abstraction operation can be performed through a non-linear operation using the learning image and the plurality of depth information. Accordingly, the depth information model corresponding to the learning image may be generated. However, the exemplary embodiment of the present disclosure may not be limited to the deep learning method. The depth information model may represent relationship between the learning image and the plurality of depth information.

The depth information model learning unit 640 may label the depth information model and store the labeled depth information model in the depth information model database 650. For example, when the depth information model is generated using a target image of a human body, the depth information model learning unit 640 may label and store the corresponding depth information model as 'human body'.

The depth information calculating unit 660 may identify the target image whenever it is inputted and load the depth information model corresponding to the target image from the depth information model database 650. The depth information calculating unit 660 may apply the loaded depth information model into the target image to extract depth information of the target image.

The exemplary embodiment of the present disclosure can be implemented by various methods. For example, the exemplary embodiment of the present disclosure can be implemented by using hardware, software or its combination. When they are implemented by software, they may be implemented as software executing in more than one processor using various operating systems or platforms. In addition, the software may be created by using any language among various appropriate programming languages or be compiled in machine language codes or intermediate codes executable in a framework or virtual machine.

In addition, when the exemplary embodiment of the present disclosure is executed in more than one processors, the exemplary embodiment of the present disclosure may be implemented by processor readable media such as a memory, a floppy disk, a hard disk, a compact disk (CD), an optical disk or a magnetic tape, or the like in which more than one programs are recorded to conduct the implementation of various exemplary embodiments of the present disclosure.

What is claimed is:

1. A method for extracting depth information based on machine learning, the method comprising:
    generating a depth information model corresponding to at least one learning image by performing machine learning using the at least one learning image and a plurality of depth information corresponding to the at least one learning image; and
    extracting depth information of a target image by loading a depth information model corresponding to the target image and applying the loaded depth information model into the target image.

2. The method of claim 1, wherein the generating of a depth information model comprises:
    generating an $N^{th}$ depth information submodel by performing machine learning using the at least one learning image and $N^{th}$ depth information corresponding to the at least one learning image; and
    generating the depth information model by performing machine learning using the generated N depth information submodels.

3. The method of claim 1, wherein the plurality of depth information is obtained through methods for extracting depth information which are different from one another.

4. The method of claim 1, further comprising generating a learning image having improved depth information by performing machine learning using the depth information model and the at least one learning image.

5. The method of claim 1, wherein the depth information model represents a relationship between the learning image and the plurality of depth information.

6. An apparatus for extracting depth information based on machine learning, the apparatus comprising:
    a depth information model learning unit configured to generate a depth information model corresponding to at least one learning image by performing machine learning using the at least one learning image and a plurality of depth information corresponding to the at least one learning image; and
    a depth information sensing unit configured to extract depth information of a target image by loading a depth information model corresponding to the target image and applying the loaded depth information model into the target image.

7. The apparatus of claim 6, wherein the depth information model learning unit generates an $N^{th}$ depth information submodel by performing machine learning using the at least one learning image and the $N^{th}$ depth information corresponding to the at least one learning image, and generates the depth information model by performing machine learning using the generated N depth information submodels.

8. The apparatus of claim 6, further comprising a depth information obtaining unit configured to obtain the plurality of depth information.

9. The apparatus of claim 6, wherein the plurality of depth information is obtained through methods for extracting depth information which are different from one another.

10. The apparatus of claim 6, wherein the depth information model learning unit is configured to generate a learning image having improved depth information by performing machine learning using the depth information model and the at least one learning image.

11. The apparatus of claim 6, wherein the depth information model represents a relationship between the learning image and the plurality of depth information.

12. An apparatus for extracting depth information based on machine learning, the apparatus comprising:
    a depth information model learning unit configured to generate a depth information model corresponding to a plurality of learning images by performing machine learning using the plurality of learning images and at least one depth information corresponding to the plurality of learning images; and
    a depth information sensing unit configured to extract depth information of a target image by loading a depth information model corresponding to the target image and applying the loaded depth information model into the target image.

13. The apparatus of claim 12, wherein the depth information model learning unit generates an $N^{th}$ depth information submodel by performing machine learning using the at least one depth information and the $N^{th}$ learning image corresponding to the at least one depth information, and generates the depth information model by performing machine learning using the generated N depth information submodels.

14. The apparatus of claim 12, further comprising a depth information obtaining unit configured to obtain the plurality of depth information.

15. The apparatus of claim 12, wherein the plurality of depth information is obtained through methods for extracting depth information which are different from one another.

16. The apparatus of claim 12, wherein the depth information model learning unit is configured to generate a learning image having improved depth information by performing machine learning using the depth information model and the plurality of learning images.

17. The apparatus of claim 12, wherein the depth information model represents relationship between the learning image and the plurality of depth information.

\* \* \* \* \*